Jan. 31, 1956 J. B. D'ANDREA ET AL 2,733,008

DIGITAL CONVERTER

Filed Oct. 28, 1952 2 Sheets-Sheet 1

INVENTORS.
JOHN B D'ANDREA
HERBERT M. HEUVER
BY Jerome P. Bloom
Wade Koontz and
ATTORNEYS INVENTORS.
JOHN B. D'ANDREA
HERBERT M. HEUVER
BY Jerome P. Bloom and Wade Koontz
ATTORNEYS

United States Patent Office 2,733,008

Patented Jan. 31, 1956

2,733,008

DIGITAL CONVERTER

John B. D'Andrea and Herbert M. Heuver, Dayton, Ohio

Application October 28, 1952, Serial No. 317,376

12 Claims. (Cl. 235—92)

(Granted under Title 35, U. S. Code (1952), sec. 266)

The invention described herein may be manufactured and used by or for the Government for governmental purposes without payment to us of any royalty thereon.

This invention relates to a new and novel digital converter capable of receiving an input from a rotating shaft without lag and transmitting such movement directly as a whole number either positive or negative to a standard print or punch card tabulating machine. Utilizing this novel converter, data may be obtained directly as to the movement characteristics of any particular object under operating conditions simply by directing such movement to a rotating shaft from which the digital converter can pick up the output and convert it into whole numbers and identify and transmit directly whether the reading is positive or negative. Accordingly, the invention makes engineering data immediately available and expedites the results to the final form, saving considerable computation and time and providing extreme accuracy. It is emphasized that the converter may be utilized to determine any particular operating condition of an object as long as its movements are transmitted to the converter by means of a rotating shaft. Moreover, whereas in the usual mechanical counter device there is considerable frictional wear introducing data transmission error, this error is eliminated in our improved device by eliminating the drag which is normal between rotating contact arm units and the counter contact plates by providing that the contact arm unit be engaged with the respective counter plate only when a reading is desired. In addition our novel converter incorporates a highly simplified device for providing a direct negative reading as well as an alignment mechanism for the contact arm units which provides extreme accuracy.

An object of this invention is to provide a new and novel digital converter.

A further object of this invention is to provide a digital converter that will follow the movement of a rotating shaft without lag and accordingly transmit a direct reading of such movement as a whole number with an optimum accuracy.

Another object of the invention is to eliminate the wear due to contact friction which is inherent in the normal mechanical counter system by a novel arrangement whereby the contacts are normally out of engagement with the counter contact plates but are simultaneously engaged therewith when a reading is desired, thus enabling a direct, accurate transmission of data instantaneously to a standard print or punch card tabulating machine without lag.

An additional object of this invention is to provide a new and novel system whereby negative input to a converter system may be directly transmitted as a whole number to a standard print or punch card tabulating machine.

A further object of this invention is to provide an improved alignment mechanism for a digital converter whereby a more positive accurate result obtains.

Other objects and advantages of our novel digital converter will be readily apparent to those skilled in the art from the following description thereof, together with the accompanying drawings, wherein.

Figures 5, 6, 7, 8:
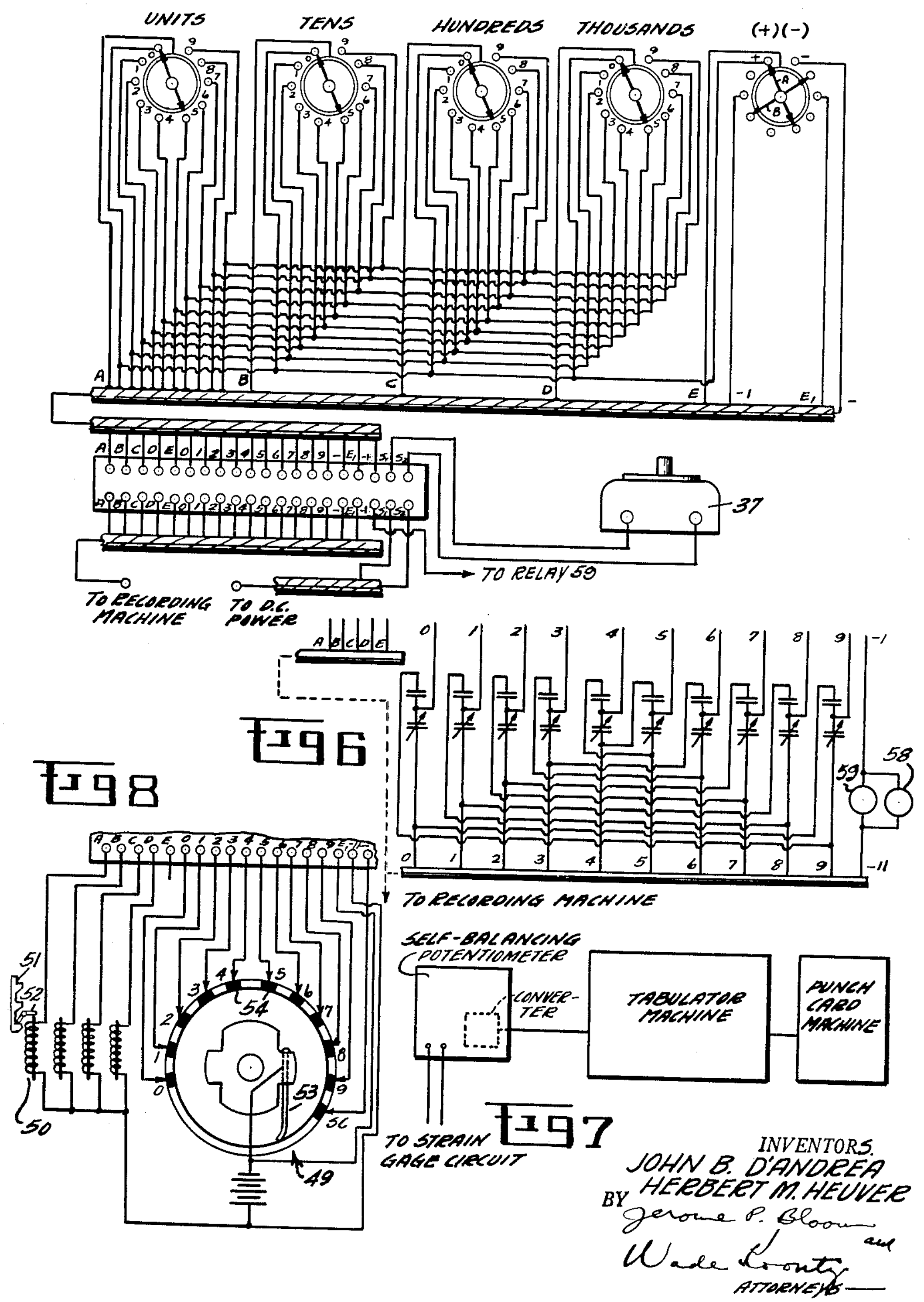
Fig. 5 is a schematic diagram of the electrical circuit employed in our digital converter to transmit direct readings in whole numbers.
Fig. 6 shows diagrammatically the control circuit for providing a direct reading of a negative input.
Fig. 7 shows schematically a practical application of the novel digital converter.

Fig. 8 is a partial schematic view of a practical application of the novel digital converter as utilized with an I. B. M. accounting machine, showing the connections of the digital converter with the sending and receiving elements in the machine.

Figure 1:
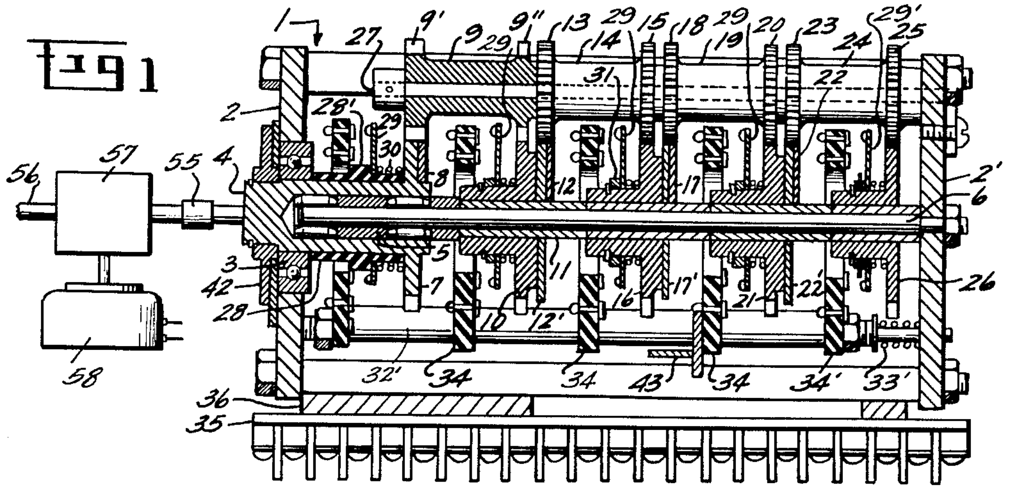
Fig. 1 shows a longitudinal partial sectional view of our novel digital converter.
Figures 2, 3, 4:
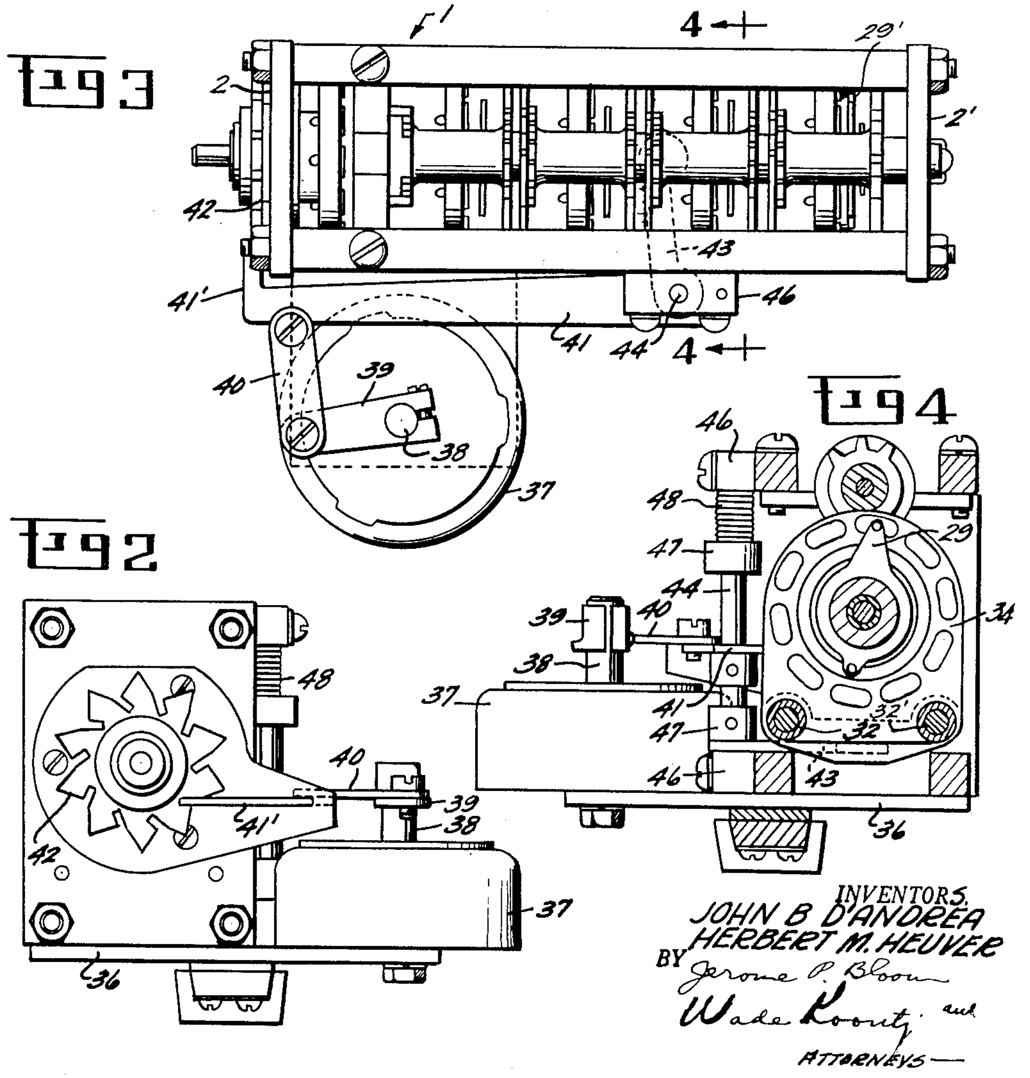
Fig. 2 is an input end view of the converter showing the alignment mechanism for the counter contact arm units therein and its relation with the solenoid control unit therefor.
Fig. 3 is a plan view of the converter.
Fig. 4 is a cross sectional view taken on line 4—4 of Fig. 3.

Our new and novel digital converter which is shown in longitudinal cross section in Fig. 1 comprises, a housing frame 1 having end plates 2 and 2'. Mounted centrally in the input end plate 2 and rotatably supported by bearing 3 therein is an input drive shaft 4 having its inner end hollowed out centrally thereof and extending within the housing 1. Needle bearings 5 within the hollowed portion of the drive shaft 4 provide a bearing surface for one end of a support shaft 6, the other end of which is reduced in diameter providing an abutment against the end plate 2'. As shown in Fig. 1, the reduced portion extends through an aperture in and is secured to the end plate 2' by a nut threaded thereon. Integral with the drive shaft 4 is a gear member 7 having a stepping member 8 which is a double tooth gear sector secured thereto. Coupled to the gear members 7 and 8 is the hub member 9 having pinions 9' and 9'' integral therewith, the pinion 9'' being coupled to a gear member 10 rotatably supported by a bushing 11 concentric with the support shaft 6. A double tooth stepping gear sector 12 connected to a gear plate 12' is secured to the gear member 10 and coupled to pinion 13 at one end of hub member 14 abutting member 9 in end to end relation. A pinion member 15 at the other end of the member 14 is coupled in a similar manner to a gear member 16 rotatably supported on a bushing or sleeve member 11 and spaced from and in parallel relation to the gear member 10. A double tooth stepping gear sector 17 connected to gear plate 17' is secured to the gear member 16 and is coupled to a pinion 18 integral with a hub member 19 having a pinion member 20 integral with the other end thereof, which pinion member 20 is coupled to a gear 21 mounted on a bushing 11 in spaced parallel relation to the gear member 16. Connected to the gear member 21 is a double tooth stepping gear sector 22 connected to gear plate 22' which is engaged with a pinion 23 integral with hub member 24, the other end of which has a pinion member 25 which is coupled to a gear 26 mounted on a bushing 11 concentric with the support shaft 6. The hub members 9, 14, 19 and 24 are rotatably supported on a shaft 27 fixed to the housing 1 in the end plate 2'. Each of the gear members 7, 10, 16, 21 and 26 have elongated hub members as shown in Fig. 1 of the drawing. A sleeve 28 having an external flange 28' is connected to the input drive shaft 4 and arranged concentrically therewith. Mounted on the sleeve 28 and the respective hub members of the gears 10, 16, 21 and 26, and in spaced parallel relation with the respective gear members, are rotating contact arm units 29 and 29'. The contact arm unit 29 comprises two transversely aligned arm elements extending from a central disc member, each arm element having a contact member at the extremity thereof as shown in Fig. 4 of the drawings. Whereas the contact arm unit 29' comprises two pairs of transversely aligned arm elements A and B, one pair being arranged perpendicular to the other as indicated in Fig. 5 of the drawings and electrically insulated therefrom and each arm element having a contact member thereon. Interposed between respective gear members and contact arm units are resilient spring members 30 biasing the contact arm units away from the respective gear members. Abutments 28' and 31 respectively engaging the contact arm units centrally thereof restrain the longitudinal movement of the contact arm units with respect to their respective supporting hub members beyond said abutments. Longitudinally aligned spring biased support rods 32 and 32' are mounted in the housing 1 in the lower portion thereof for movement with respect thereto and longitudinally thereof. The end portions of the respective members 32 and 32' are reduced in diameter and bear in the end plates 2 and 2' respectively. Spring members 33 and 33' are interposed respectively between the side plate 2' and the enlarged ends of the support members 32 and 32'. Counter contact plates 34 and 34' are fixed to the support members 32 and 32' in the manner shown in Fig. 4 of the drawing. Accordingly the counter contact plates are slidable with the support rods but nonrotatable with respect to the housing 1 and arranged parallel to each other and to respective normally spaced opposed contact arm units 29 and 29'. While any number of counter contact plates and cooperating arm units may be provided to meet the particular necessities, as shown in Fig. 1 a units plate, a tens plate, a hundreds plate, a thousands plate and a plus-minus plate have been employed in the practical embodiment therein. Each of the plates has ten radially arranged contact members corresponding to numerals 0 to 9 and input ring members concentric therewith affixed thereto. A terminal block 35 is secured to one side of the housing 1 to provide terminal connections for electrical leads, interconnected with the respective contacts and ring members. Mounting blocks 36 provide the mounting for the terminal block 35. One of said mounting blocks 36 is elongated to provide a support arm for a rotary solenoid 37. The rotary solenoid 37 has a control shaft 38 extending therefrom to which is clamped a control arm 39 connected by a link 40 to an elongated arm member 41. Elongated arm member 41 has one end thereof 41' substantially perpendicular thereto and arranged adjacent a star wheel 42 fixed to the input drive shaft 4. This star wheel 42 is the alignment wheel for the contact arms in the converter. Upon energization of the rotary solenoid 37 the member 41' will engage the star wheel, and align the respective contact arm units with corresponding adjacent contacts on respective contact plates so that a positive engagement of the contacts will be made when a reading is desired. Connected to the other end of the arm 41 is a shaft 44 rotatably mounted in blocks 46 secured to the housing 1. Collar members 47 are fixed to the shaft 44 as shown in Fig. 4 of the drawings by any suitable means. A coil spring 48 concentric with the shaft 44 is fixed at its respective ends to block 46 and upper collar 47 which form end abutments for the spring. Secured to the lower end of shaft 44 by a collar 47 is the contact plates control arm 43; the free end of the arm 43 abuts a contact plate 34. The springs 48, 33 and 33' normally bias the control arm 43 out of a forcing engagement with contact plate 34. Upon energization of the solenoid 37, instantaneously following the alignment of the contact arm units by engagement of the star wheel by the member 41' the control arm 43 engages and moves the contact plates and support members, since they are secured to each other, so that the contact plates are brought into engagement with the respective contact arm units to provide an instantaneous reading.

Provision is made for direct negative read out as shown in Fig. 1 by connecting to the input drive shaft at the outer end thereof, by a coupling member 55, drive shaft member 56 having a differential gear box 57 interposed therein to which is interconnected a rotary solenoid 58, which is adapted to be energized by the negative contact on the plus-minus contact plate of the digital converter. Also a ten-pole double-throw relay 59 as shown in Fig. 6 is incorporated in the negative contact of the plus-minus plate in parallel with the rotary solenoid 47. The relay converts the usual negative complemental reading provided through the contact plates to a direct negative read out which is transmitted to the print machine.

Referring to Fig. 5 in the drawings, as can be readily seen, an electrical input lead extends to each of the counter plates including the plus-minus plate at the ring member thereof. The contact arm units 29 have two contacts as described previously herein, one of which engages the ring member, the other of which contacts one of the ten contact members on the counter plates 34 to provide an output through such contact to transmit a signal to provide a direct reading to a print or punch card machine. As can be seen further, the output leads from the respective contacts on the respective plates are electrically interconnected. The plus-minus plate 34' is arranged structurally similar to the other counter plate but functions with its cooperating contact arm unit 29' particularly as a control device to accomplish direct negative read out. The plus-minus plate 34' has an input lead E thereto from the power source, a positive output lead from the 0 contact, and a negative output lead coming off the contact 9. Also as shown in Fig. 5 of the drawings there are two leads $E_1$, and $-1$ diametrically connected to contacts on the contact plate 34'. The contact arm elements A have one contact which is adapted to engage the ring member thereon and the other contact adapted to engage one of the ten contact members on the plate 34'. However, the contact arm elements B are arranged so as to normally contact two diametrically opposed contact members on the plate 34', displaced one space from respective contact elements to which the input lead $E_1$, is connected and the negative lead $-1$ are connected respectively.

In a direct positive read out, the output of the object being tested may be transmitted by a rotating shaft to the input drive shaft 4, which input is directed by drive shaft 4 to cause rotation of contact arms 29 and 29' through gears 7, 10, 16, 21 and 26. When a reading is desired, a print machine control button may be so arranged to be depressed to stop the test transmitting instrument, energize the solenoid 37 to align the contact output arms with the respective adjacent contact of that particular moment by engagement of arm 41' with the star wheel. Substantially instantaneously movement of member 41 moves the counter plates into engagement with their respective contact arms by means of control arm 43. At this point, the contacts on the respective counter plates will transmit electrically to the tabulating machine the reading indicated corresponding to the particular contacts made by the respective contact arms.

In the event a negative read out is required, upon the reverse rotation of the input drive shaft past +0000 to indicate a negative output, each of the gear members will simultaneously kick over from +0000 to −9999 and start recording in a negative direction giving a number complemental to the actual negative output. As the gears kick over there is the loss of a digit which must be compensated for since a direct negative read out is desired. Since contact arm 29' is continuously in contact with contact plate 34', immediately on transfer from +0000 to −9999, the negative contact (−1) on the plus-minus plate will be engaged by its respective contact arm element B. This engagement will energize the rotary solenoid 58 which will cause the input shaft of the digital converter through the differential gearing to rotate 36° or 1/10 revolution in a negative direction. This provides an additional displacement which is additive to the negative displacement of negative rotation providing a necessary correction factor to compensate for the digit loss. In absence of this correction factor, introduced by the rotary solenoid 58, an error will occur in the actual negative reading produced by the digital converter. For example, to provide a direct negative read out as shown in the drawings, a ten-pole double-throw relay 59 is provided in conjunction with the negative contacts of the plus-minus wheel and actuated substantially simultaneously with solenoid 58 which converts the negative complementary reading on the contact plates to a positive direct negative read out on a print and punch card machine. When the interchange is accomplished, as is obvious, on actuation of the relay, 9 becomes 0, 8 becomes 1, 7 becomes 2, etc. As can be seen, in the transformation of the complementary number by the relay in the absence of the correction factor introduced by rotary solenoid 58 an error in one digit will result.

An example of the use of the novel converter for positive read out is shown schematically in Fig. 7 of the drawing. Here the converter is inserted in connection with a self-balancing potentiometer, which is connected to a strain guage circuit. The converter in turn is operatively connected to a tabulating and punch card machine for transmission of such output of the digital converter. When a reading is desired, the operator engages a print button on the punch card machine to stop transmission, and to energize the rotary solenoid 37 to cause the element 41' to interrupt rotation of drive shaft 4 and to align the contact arms and causes the element 43 to move the slidable contact plates into engagement with respective opposed contact arm units causing electrical impulses to be transmitted therefrom indicative of the digit position giving a direct digit read out which is transmitted to the tabulating machine and the punch card machine directly. In the event that mechanism may be employed whereby there will be both positive and negative outputs from the device being tested, for negative input to the converter the reverse rotation of the drive shaft 4 will kick over the gearing, and provide an immediate negative contact on the negative wheel through contact −1 that will energize the rotary solenoid 58 to introduce a 36° rotation of the input shaft to provide a correction for the digit loss in the transfer from a +0000 to a −9999 reading and the relay 59 is actuated to convert the complemental reading to a direct negative reading.

As a practical application of our novel converter unit, a partial schematic of the converter circuit as used in conjunction with an I. B. M. accounting machine is shown in Fig. 8 of the drawings. The I. B. M. accounting machine includes an emitter 49 and a series of type bar solenoids 50 associated with the recording type bars 51 therein each being serrated and each corresponding to a contact plate on the converter. A lock element 52 is operatively arranged adjacent the serrated side of each type bar and so as to be actuable by the respective solenoid. A source of power connects the solenoids and the emitter. Accordingly a circuit is completed to the respective counter plates in our novel digital converter through an input from the source of power to the respective plates through the type bar solenoids and back through the emitter to the source. In addition a circuit is completed from the power source through input lead $E_1$, across contact arm elements B to negative lead −1 in the event of a negative input to the converter. A control element in the form of a button may be provided to energize the emitter, which has a rotating brush 53 and a series of eleven contacts 54, to cause the emitter brush to make a single complete rotation wiping across the respective contacts in order, each of which corresponds to a particular contact (numeral indicator) on the contact plates. As the brush wipes across a contact on the emitter which corresponds to a particular contact made by a contact arm on a contact plate, a circuit is completed through that contact plate to the appropriate type bar solenoid corresponding to the contact made. The type bars are mechanically geared to the emitter and as the emitter rotates the type bars move upwardly presenting the type with numerals 9 to 0 in succession in front of a printing hammer. As the brush wipes across a contact made on a contact plate, at which point the type numeral corresponding to that contact is aligned with the hammer, the type bar solenoid connected to the contact plate in question and completing its circuit is energized to cause the lock element 52 to engage a serration on the type bar to lock it in place with the type numeral corresponding to the contact made aligned with the printing hammer. Similarly the eleventh contact on the emitter is in the circuit of the plus-minus contact plate and where there is negative contact made on that plate, as the brush of the emitter wipes its associated contact the appropriate type will be set up and printed.

While preferred embodiments and applications of our invention have been set forth, nothing herein should be construed to limit the invention thereto, since various modifications and applications of the novel converter should be readily apparent to those skilled in the art such as lies within the scope of the appended claims.

We claim:

1. A digital converter comprising a housing, an input receiving means mounted therein, a series of input transmitting means operatively connected to said input receiving means and including contact arms connected for rotation therewith and in biased relation thereto, signal transmitting means arranged continuously and respectively parallel to each other and normally spaced from said rotatable contact arms, means interconnecting said signal transmitting means for conjoint movement thereof, control means, a control arm pivotally connected to said housing adjacent one of said signal transmitting means, crank means interconnecting said control means and control arm whereby on actuation of said control means, said crank arm will be pivoted engaging one of said signal transmitting means for simultaneous movement of said signal transmitting means into engagement with said contact arms whereby a direct output signal equal to the input is transmitted, wherein the signal transmitting means includes a plus-minus signal transmitting means whereby the input may be directly transmitted as a whole number whether positive or negative.

2. A digital converter comprising a housing, an input receiving means mounted therein, a series of plus-minus signal input transmitting means operatively connected to said input receiving means and including contact arms connected for rotation therewith and in biased relation thereto, signal transmitting means arranged continuously and respectively parallel to each other and normally spaced from said rotatable contact arms, means interconnecting said signal transmitting means for conjoint movement thereof, control means, a control arm pivotally connected to said housing adjacent one of said signal transmitting means, crank means interconnecting said control means and control arm whereby on actuation of said control means, said crank arm will be pivoted engaging one of said signal transmitting means for simultaneous movement of said signal transmitting means into engagement with said contact arms whereby a direct signal equal to the input is transmitted, a compensating relay operatively connected to said input receiving means and signal means operatively connecting said relay and said plus-minus signal transmitting means whereby on negative input to the digital converter, the plus-minus signal transmitting means will energize said compensating relay to effect a negative incremental rotation through said input receiving means so that a negative output equal to the negative input will be transmitted directly as a whole number.

3. A digital converter comprising a housing, an input receiving drive shaft mounted therein, said drive shaft being geared to a series of rotatable counter contact arms arranged in spaced parallel relation to each other, signal transmitting contact plates operatively interconnected for conjoint movement and having contacts thereon in circular fashion slidably but nonrotatably mounted in said housing, each respectively continuously parallel to and normally spaced from an opposed rotating contact arm, and contact aligning control means, said control means operatively engaging with said input receiving drive shaft on energization thereof to interrupt the rotation of said drive shaft and means connected with said control means and operable substantially simultaneously thereby to engage said signal transmitting contact plates to bring said contact plates into contacting engagement with respective opposed contact arms to directly transmit the input as a whole number to a recording machine.

4. The structure as set forth in claim 3 including alignment means secured to said input receiving drive shaft, said control means including a link operable to engage said alignment means to align the contact arms and the contacts of respective contact plates immediately prior to contacting engagement thereof.

5. The structure as set forth in claim 3, the signal transmitting plates including a plus-minus signal transmitting plate whereby direct read out may be obtained whether positive or negative.

6. A digital converter comprising a housing, an input receiving means therein adapted to receive an input from a rotating shaft, said input receiving means being drivingly connected to a series of interrelated gears, contact arms operatively connected in biased relation to said gears for rotation therewith and arranged in parallel spaced relation on a support shaft coextensive with the input receiving means, signal transmitting contact plates arranged in continuously parallel spaced relation to said respective contact arms, spring biased support means mounted in said housing and fixed to said contact plates for sliding relation therewith with respect to said housing, and control means having means connected therewith operable to engage said input receiving means to momentarily interrupt said receiving means and substantially simultaneously to engage one of said signal transmitting contact plates to bring said plates into contacting relation with the respective contact arms whereby a direct read out may obtain.

7. The structure as set forth in claim 6, including alignment means secured to said input receiving means, said means connected to said control means comprising a link means pivotally connected to a rotatable control shaft, a reading control arm secured to said link means and having means connected to spaced portions thereof operable to respectively engage said alignment means to interrupt said input receiving means and align the contact arms and substantially simultaneously bring said signal transmittnig plates into contact with said contact arms for a highly accurate read out.

8. The structure as set forth in claim 6, wherein the signal transmitting contact plates include a plus-minus signal transmitting contact plate whereby the input may be directly transmitting as a whole number whether positive or negative.

9. The structure as set forth in claim 8, and a compensating relay operatively connected to the input receiving means, signal means operativley connecting said relay and said plus-minus signal transmitting contact plate whereby on negative input to the digital converter the plus-minus signal transmitting means will energize said compensating relay to effect a negative incremental rotation through said input receiving means so that a negative output equal to the negative input will be transmitted directly as a whole number.

10. A digital converter comprising a housing, input receiving means mounted in one end of said housing for rotation relative thereto, a support shaft in said housing coaxial with said input receiving means and fixed relative thereto, input transmitting means operatively connected to said input receiving means arranged in spaced relation and rotatable relative to said support shaft, additional support means extending longitudinally of the housing, signal transmitting means fixed against rotation mounted for conjoint movement longitudinally of said additional support means and arranged in normally spaced relation relative to the respective input transmitting means, control means having interconnected means operatively connected to said input receiving means and to said signal transmitting means operative to interrupt the rotation of the input receiving means and to move said signal transmitting means into contacting engagement with the input transmittig means whereby a positive direct read out obtains.

11. A digital converter for transmitting a signal in terms of whole numbers comprising an input receiving means, input transmitting means operatively connected to said input receiving means including a plus-minus input transmitting means, signal transmitting means arranged in normally spaced relation to the respective input transmitting means, one of said signal transmitting means having a positive and a negative output means and having a continuous operative contact with the opposed plus-minus input transmitting means spaced therefrom, control means connecting said negative output means and said input receiving means to introduce a corrective factor to said input receiving means on initial negative input, converter means associated with said signal transmitting means to convert the complementary negative reading transmitted on negative input to a direct negative read out and additional control means operatively connected to said input receiving means and said signal transmitting means effective to bring the signal transmitting means into contacting relation with the input transmitting means to transmit a direct negative read out.

12. A digital converter comprising an input receiving means adapted to receive an input signal from a rotating shaft, input transmitting means operatively connected to the input receiving means, signal transmitting means arranged parallel to and normally spaced from the input transmitting means, said signal transmitting means including a plus-minus signal transmitting means having a positive and a negative output means and contacts normally engaging the opposed input receiving means, a first control means operatively interconnecting the negative output means and the input receiving means to cause an additional 36° negative rotation of the input receiving means on negative input, relay means operative on negative input to convert the normally complementary negative reading from the signal transmitting means to a direct negative reading and control means associated with the input receiving means and the signal transmitting means operative to move the signal transmitting means into contacting relation with the input transmitting means whereby a direct negative read out may obtain.

References Cited in the file of this patent

UNITED STATES PATENTS

| | | |
|---|---|---|
| 1,350,924 | Eaton | Aug. 24, 1920 |
| 1,734,456 | Ygger | Nov. 5, 1929 |
| 1,822,594 | Lake | Sept. 8, 1931 |
| 1,928,656 | Von Reppert | Oct. 3, 1933 |
| 1,996,189 | Biro | Apr. 2, 1935 |
| 2,364,758 | Roggenstein | Dec. 12, 1944 |
| 2,493,709 | Wittenmyer | Jan. 3, 1950 |
| 2,620,980 | Brown | Dec. 9, 1952 |
| 2,620,981 | Benson et al. | Dec. 9, 1952 |